US012749067B2

(12) United States Patent
Lee et al.

(10) Patent No.: US 12,749,067 B2
(45) Date of Patent: Sep. 29, 2026

(54) SERVER AND CONTROL METHOD THEREOF

(71) Applicants: HYUNDAI MOTOR COMPANY, Seoul (KR); KIA CORPORATION, Seoul (KR)

(72) Inventors: Seung Jae Lee, Gwangmyeong-si (KR); Haeyoung Kwon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 191 days.

(21) Appl. No.: 18/070,593

(22) Filed: Nov. 29, 2022

(65) Prior Publication Data

US 2023/0222486 A1 Jul. 13, 2023

(30) Foreign Application Priority Data

Jan. 13, 2022 (KR) ........................ 10-2022-0005058

(51) Int. Cl.
*G06Q 20/34* (2012.01)

(52) U.S. Cl.
CPC .................................. *G06Q 20/354* (2013.01)

(58) Field of Classification Search
CPC .................................................... G06Q 20/354
See application file for complete search history.

(56) References Cited

U.S. PATENT DOCUMENTS

| | | | | |
|---|---|---|---|---|
| 6,088,680 | A * | 7/2000 | Hoshino | G06Q 20/367 705/13 |
| 10,769,392 | B1 * | 9/2020 | Gravelle | H04W 4/027 |
| 2004/0206817 | A1 * | 10/2004 | Grant | G07B 15/063 235/384 |
| 2006/0145893 | A1 * | 7/2006 | Hassett | G07B 15/063 340/901 |
| 2007/0252678 | A1 * | 11/2007 | Garcia Alonso | G07B 15/063 340/10.31 |
| 2008/0204278 | A1 * | 8/2008 | Tsuzuki | G07B 15/063 340/928 |
| 2015/0134428 | A1 * | 5/2015 | Li | G06Q 20/326 705/13 |
| 2016/0140535 | A1 * | 5/2016 | Noe | G06Q 20/3574 705/39 |
| 2017/0127230 | A1 * | 5/2017 | Enriquez | H04W 4/48 |
| 2021/0168602 | A1 * | 6/2021 | Kim | H02J 50/10 |
| 2022/0051239 | A1 * | 2/2022 | Bergeron | G06Q 20/409 |
| 2023/0237478 | A1 * | 7/2023 | Zou | G06Q 20/3552 705/44 |

* cited by examiner

*Primary Examiner* — David P Sharvin
(74) *Attorney, Agent, or Firm* — Lempia Summerfield Katz LLC

(57) ABSTRACT

A server includes a communicator; and a controller configured to control the communicator. The controller is configured to: in response to receiving a card issuance request from a user terminal through the communicator, control the communicator to request a card company server corresponding to the card issuance request for card information; and in response to receiving the card information from the card company server through the communicator, control the communicator to transmit a card issuance command including a security key and the card information to an electronic toll collection system (ETCS) terminal of a vehicle.

14 Claims, 10 Drawing Sheets

SERVER AND CONTROL METHOD THEREOF

CROSS-REFERENCE TO RELATED APPLICATION

This application claims under 35 U.S.C. § 119 the benefit of priority to Korean Patent Application No. 10-2022-0005058, filed on Jan. 13, 2022 in the Korean Intellectual Property Office, the entire contents of which are incorporated herein by reference.

BACKGROUND

1. Technical Field

The disclosure relates to a server that manages a card of an electronic toll collection system (ETCS) terminal and a control method thereof.

2. Description of the Related Art

An electronic toll collection system (ETCS), such as HI-PASS, automatically charges users a toll by using a standardized application interface of the Dedicated Short-Range Communication protocols in order to reduce traffic delays.

In other words, the ETCS is a system capable of automatically transmitting and receiving toll information between roadside equipment and a terminal of a vehicle (on-board equipment or ETCS terminal), based on Dedicated Short-Range Communications.

For toll transaction processing, when a vehicle approaches, the ETCS recognizes a class of vehicle by a vehicle classification device and transmits information through a transmission and reception antenna on a lane by linking to a terminal installed in the vehicle.

Recently, instead of inserting a credit card into an ETCS terminal, a card integrated circuit (IC) chip is embedded in the ETCS terminal and card information issued by a card company is input into the card IC chip, and thus structural restrictions or theft risk that may be caused may be prevented when using a physical credit card.

SUMMARY

An aspect of the disclosure provides a server and a control method thereof that may manage a card performing payment in an electronic toll collection system (ETCS) terminal, through issuance or deletion of the card.

Additional aspects of the disclosure are set forth in part in the following description, should be in part apparent from the description, or may be learned by practice of the disclosure.

According to an embodiment of the disclosure, a server includes a communicator and a controller configured to control the communicator. The controller is configured to, in response to receiving a card issuance request from a user terminal through the communicator, control the communicator to request a card company server corresponding to the card issuance request for card information. The controller is also configured to, in response to receiving the card information from the card company server through the communicator, control the communicator to transmit a card issuance command including a security key and the card information to an electronic toll collection system (ETCS) terminal of a vehicle.

The card issuance command includes a supplementary security domain (SSD) creation command and an applet creation command.

In response to receiving a card issuance success confirmation message from the vehicle, the controller is configured to match and store customer information and the card information issued to the vehicle.

The controller is configured to: in response to receiving the card issuance request from the user terminal through the communicator, determine whether a previously issued card exists in the ETCS terminal, and in response to the previously issued card being existent, control the communicator to transmit, to the user terminal, a message confirming whether to delete the previously issued card.

In response to receiving a deletion command for the previously issued card from the user terminal through the communicator, the controller is configured to control the communicator to transmit a card deletion command including an authorization key to the ETCS terminal of the vehicle.

The card deletion command includes an SSD deletion command and an applet deletion command.

In response to receiving a card deletion success confirmation message from the vehicle, the controller is configured to control the communicator to transmit the card issuance command to the ETCS terminal of the vehicle.

In response to receiving the card issuance success confirmation message from the vehicle, the controller is configured to update the pre-stored card information issued to the vehicle.

In response to receiving a card deletion request from the card company server, the controller is configured to identify customer information corresponding to customer information of the card deletion request from among pre-stored customer information and control the communicator to transmit a card deletion command including an authorization key to a vehicle corresponding to the identified customer information.

In response to receiving a card deletion success confirmation message from the vehicle, the controller is configured to update the pre-stored card information issued to the vehicle.

According to an embodiment of the disclosure, there is provided a control method of a server including a communicator, the control method including: in response to receiving a card issuance request from a user terminal through the communicator, controlling the communicator to request a card company server corresponding to the card issuance request for card information; and in response to receiving the card information from the card company server through the communicator, controlling the communicator to transmit a card issuance command including a security key and the card information to an ETCS terminal of a vehicle.

The card issuance command includes an SSD creation command and an applet creation command.

The control method further includes, in response to receiving a card issuance success confirmation message from the vehicle, matching and storing customer information and the card information issued to the vehicle.

The control method further includes, in response to receiving the card issuance request from the user terminal through the communicator, determining whether a previously issued card exists in the ETCS terminal; and in response to the previously issued card being existent, controlling the communicator to transmit, to the user terminal, a message confirming whether to delete the previously issued card.

The control method further includes, in response to receiving a deletion command for the previously issued card from the user terminal through the communicator, controlling the communicator to transmit a card deletion command including an authorization key to the ETCS terminal of the vehicle.

The card deletion command includes an SSD deletion command and an applet deletion command.

The control method further includes, in response to receiving a card deletion success confirmation message from the vehicle, controlling the communicator to transmit the card issuance command to the ETCS terminal of the vehicle.

The control method further includes, in response to receiving the card issuance success confirmation message from the vehicle, updating the pre-stored card information issued to the vehicle.

The control method further includes, in response to receiving a card deletion request from the card company server, identifying customer information corresponding to customer information of the card deletion request from among pre-stored customer information; and controlling the communicator to transmit a card deletion command including an authorization key to a vehicle corresponding to the identified customer information.

The control method further includes, in response to receiving a card deletion success confirmation message from the vehicle, updating the pre-stored card information issued to the vehicle.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
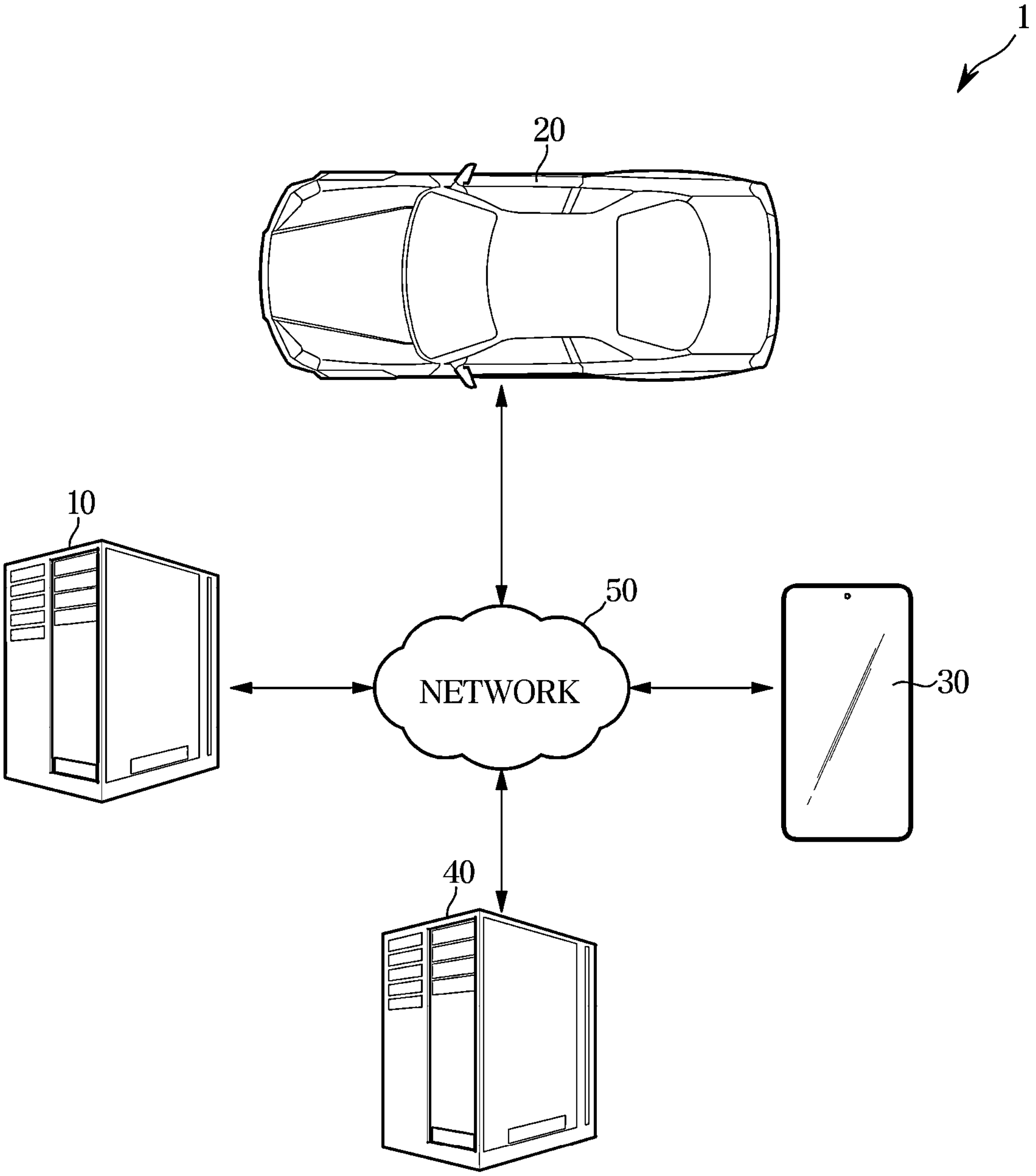
FIG. 1 illustrates an electronic toll collection system (ETCS) card management system according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It should be understood that when an element is referred to as being "connected" to another element, the element can be directly or indirectly connected to the other element, wherein the indirect connection includes "connection" via a wireless communication network.

It should be understood that the term "include" when used in this specification specifies the presence of stated features, integers, steps, operations, elements, and/or components. However, the term "include" does not preclude the presence or addition of one or more other features, integers, steps, operations, elements, components, and/or groups thereof.

It should be understood that the singular forms are intended to include the plural forms as well, unless the context clearly dictates otherwise.

The terms such as "~part", "~device", "~member", "~module", "~block", and the like may refer to a unit for processing at least one function or act. For example, the terms may refer to at least process processed by at least one hardware, such as field-programmable gate array (FPGA)/application specific integrated circuit (ASIC), software stored in memories or processors. When a part, device, member, module, block, or the like of the present disclosure is described as having a purpose or performing an operation, function, or the like, the part, device, member, module, block, or the like should be considered herein as being "configured to" meet that purpose or to perform that operation or function.

Reference numerals used for method steps are just used for convenience of explanation but are not used to limit an order of the steps. Thus, unless the context clearly dictates otherwise, the written order may be practiced otherwise.

Hereinafter, a server and a control method thereof according to embodiments of the disclosure are described in detail with reference to the accompanying drawings.

FIG. 1 illustrates an electronic toll collection system (ETCS) card management system according to an embodiment.

Referring to FIG. 1, an ETCS card management system 1 according to an embodiment includes a server 10 providing a connected car service (CCS) for a vehicle 20, the vehicle 20 including an ETCS terminal, a user terminal 30, and a card company server 40 issuing a card to the ETCS terminal.

Each of the server 10, the vehicle 20, the user terminal 30, and the card company server 40 may be connected to a network 50 by wire or wirelessly and transmit and receive data with each other through the network 50.

According to an embodiment, when receiving a card issuance request from the user terminal 30, the server 10 may deliver the card issuance request to the card company server 40, receive card information from the card company server 40, and transmit a card issuance command including a security key and the card information to the vehicle 20.

Also, according to an embodiment, when receiving a card deletion command from the card company server 40, the server 10 may transmit the card deletion command including an authorization key to the vehicle 20.

Also, according to an embodiment, by matching and storing customer information and card information about a card issued to the vehicle, the server 10 may manage the customer information and the card information. In this instance, the server 10 may update the customer information and the card information, when a change in card (issuance of a new card or a deletion of card) occurs.

According to an embodiment, when receiving the card issuance command or the card deletion command from the server 10, the vehicle 20 may deliver the card issuance command or the card deletion command to the ETCS terminal.

The ETCS terminal of the vehicle 20 may create or delete a supplementary security domain (SSD) and an applet based on the card issuance command or the card deletion command. Thus, a card to a card integrated circuit (IC) chip may be issued or the card issued to the card IC chip may be deleted.

According to an embodiment, the user terminal 30 may receive an input from a driver of the vehicle 20. For example, the user terminal 30 may receive an input for issuance of a new card and transmit a card issuance request to the server 10 based on the input.

According to an embodiment, the card company server 40 may generate card information about a card to be issued to the card IC chip of the ETCS terminal and transmit to the server 10. Also, when a card has expired or a payment is outstanding, the card company server 40 may transmit the card deletion request to the server 10.

As such, the server 10 controls the issuance of the card to the card IC chip of the ETCS terminal or deletion of the issued card, and thus the card of the ETCS terminal may be managed.

The constituent components of the ETCS card management system 1 and the relationships thereof have been described above. Hereinafter, the constituent components are described in greater detail.

Figure 2:
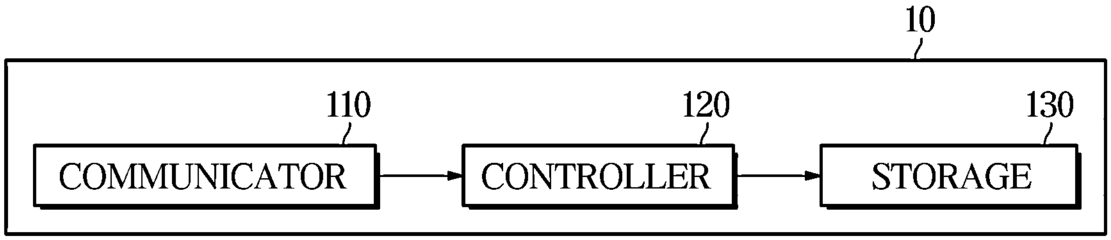
FIG. 2 is a control block diagram illustrating a server according to an embodiment.

FIG. 2 is a control block diagram illustrating the server 10 according to an embodiment.

Referring to FIG. 2, the server 10 according to an embodiment includes a communicator 110, a controller 120, and a storage 130. Here, the controller 120 controls transmission of a signal for issuing or deleting a card of an ETCS terminal to the ETCS terminal, and the storage 130 stores various information required for control.

According to an embodiment, the communicator 110 is connected to the network 50 to transmit and receive data with the vehicle 20, the user terminal 30, and the card company server 40. To this end, the communicator 110 may be provided as a known type of communication module.

According to an embodiment, when receiving a card issuance request from the user terminal 30 through the communicator 110, the controller 120 may control the communicator 110 to request the card company server 40 corresponding to the card issuance request for card information.

According to an embodiment, when receiving the card information from the card company server 40 through the communicator 110, the controller 120 may control the communicator 110 to transmit a card issuance command including a security key and the card information to the ETCS terminal of the vehicle 20.

In this instance, the security key corresponds to a key with an authority of issuance of card and may be issued by a personal secure application module (PerSAM). The PerSAM is a card-type security device that is required to be used only according to a specified procedure in order to securely deliver a key for issuing a card (electronic currency). In other words, the PerSAM is a module having key information required for issuance and may be provided by the Korea Expressway Corporation in charge of ETCS.

Also, the card information may include an expiration date, card serial number, issuance-eligible customer information, issuance-eligible vehicle information, and the like.

Also, the card issuance command may include an SSD creation command and an applet creation command.

According to an embodiment, when receiving a card issuance success confirmation message from the vehicle 20, the controller 120 may match and store customer information and the card information issued to the vehicle 20 and thus manage the customer information and the card information.

According to an embodiment, when receiving the card issuance request from the user terminal 30 through the communicator 110, the controller 120 may determine whether a previously issued card exists in the ETCS terminal. In other words, the controller 120 may determine whether a card issued to a user of the user terminal 30 exists based on the pre-stored customer information and card information.

According to an embodiment, when the previously issued card does not exist in the ETCS terminal, the controller 120 may control the communicator 110 to transmit the card issuance command to the vehicle 20 based on the card information received from the card company server 40, as described above.

Also, according to an embodiment, when the previously issued card exists in the ETCS terminal, the controller 120 may control the communicator 110 to transmit a message confirming whether to delete the issued card to the user terminal 30.

When receiving a deletion command for the issued card from the user terminal 30 through the communicator 110, the controller 120 may control the communicator 110 to transmit a card deletion command including an authorization key to the ETCS terminal of the vehicle 20. In this instance, the authorization key corresponds to a key with an authority to delete the card and may be issued by the PerSAM.

Also, the card deletion command may include an SSD deletion command and an applet deletion command.

When receiving a card deletion success confirmation message from the vehicle 20 through the communicator 110, the controller 120 may control the communicator 110 to transmit the card issuance command to the ETCS terminal of the vehicle 20.

Also, when receiving the card issuance success confirmation message from the vehicle 20 through the communicator 110, the controller 120 may update the pre-stored card information issued to the vehicle 20 and thus manage the customer information and the card information.

According to an embodiment, when receiving a card deletion request from the card company server 40 through the communicator 110, the controller 120 may identify customer information corresponding to customer information of the card deletion request from among the pre-stored customer information and control the communicator 110 to transmit the card deletion command including the authorization key to a vehicle corresponding to the identified customer information.

Also, when receiving the card deletion success confirmation message from the vehicle 20, the controller 120 updates the pre-stored card information issued to the vehicle 20 and thus manages the customer information and the card information.

The controller 120 may include at least one memory storing a program for performing the aforementioned operations and operations described below and include at least one processor for implementing a stored program. When a plurality of memories and processors are provided, the plurality of memories and processors may be integrated into one chip or provided in physically separated locations.

According to an embodiment, the storage 130 may store a variety of modules (e.g., PerSAM) required for deleting or issuing the card and match and store card information corresponding to an issued card and customer information corresponding to the card information. To this end, the storage 130 may be provided as a known type of storage medium.

Figure 3:
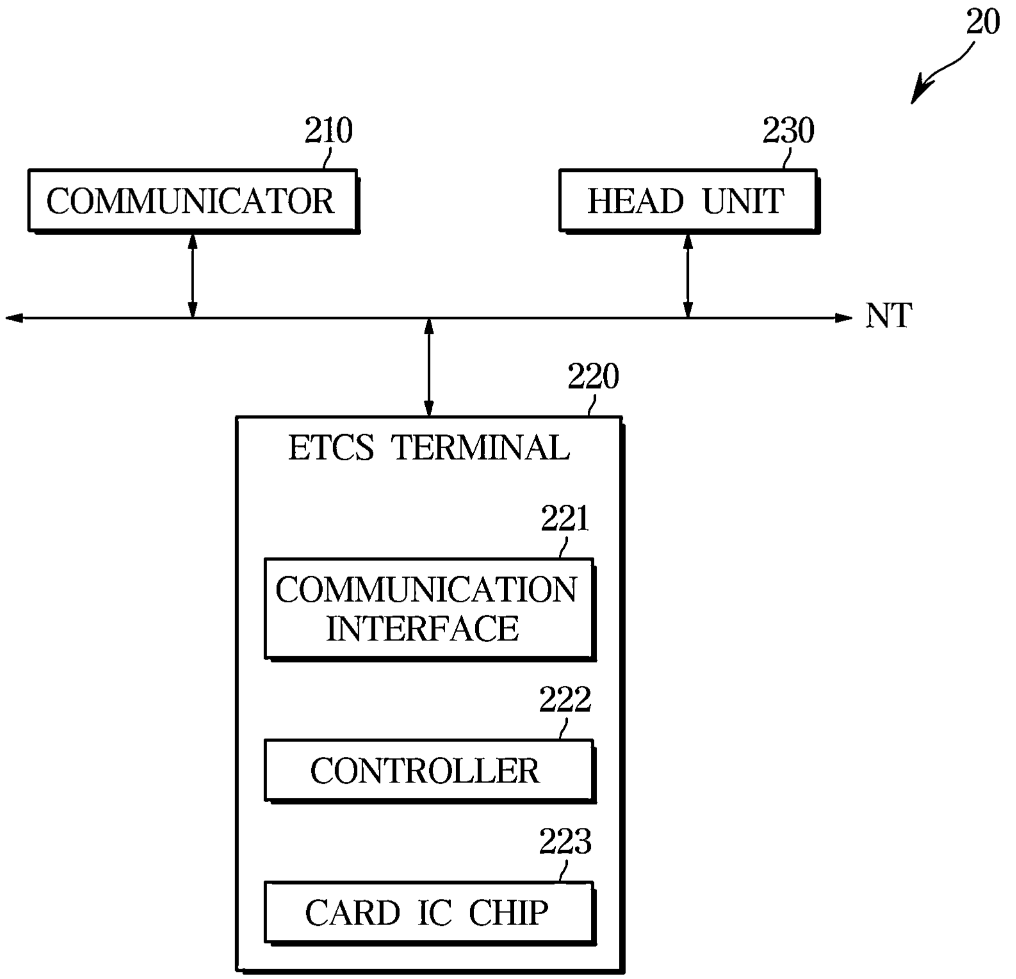
FIG. 3 is a control block diagram illustrating a vehicle according to an embodiment.

FIG. 3 is a control block diagram illustrating the vehicle 20 according to an embodiment.

Referring to FIG. 3, the vehicle 20 according to an embodiment includes a communicator 210, an ETCS terminal 220 including a card IC chip 223, and a head unit 230 controlling a CCS.

Each of the communicator 210, the ETCS terminal 220, and the head unit 230 is connected to a vehicle network (NT) and may transmit and receive data with each other.

According to an embodiment, the communicator 210 is wirelessly connected to the network 50 to perform communication with the server 10. To this end, the communicator 210 may be a known type of wireless communication module.

According to an embodiment, the ETCS terminal 220 may include a communication interface 221 connected to the vehicle network (NT) to perform communication, a controller 222 controlling issuance and deletion of card, and the card IC chip 223 in which card information of an issued card is input and which performs payment.

According to an embodiment, the communication interface 221 is connected to the vehicle network (NT) to perform communication. To this end, the communication interface 221 may be provided as a known type of communication module.

According to an embodiment, when receiving a card issuance command including a security key and card information through the head unit 230, the controller 222 may issue a card to the card IC chip 223 using the security key. Specifically, by generating an SSD and an applet corresponding to the card information in the card IC chip 223 by using the security key, the controller 222 may issue the card.

Also, when issuing the card to the card IC chip 223 is completed, the controller 222 may allow a card issuance success confirmation message to be transmitted to the server 10 through the head unit 230.

According to an embodiment, when receiving a card deletion command including an authorization key from the head unit 230 through the communication interface 221, the controller 222 may delete the card issued to the card IC chip using the authorization key. In this instance, deleting the card issued to the card IC chip may be deleting an applet and a SSD corresponding to the card.

Also, when deleting the card from the card IC chip 223 is completed, the controller 222 may allow a card deletion success confirmation message to be transmitted to the server 10 through the head unit 230.

The controller 222 may include at least one memory storing a program for performing the aforementioned operations and operations described below and include at least one processor for implementing a stored program. When a plurality of memories and processors are provided, the plurality of memories and processors may be integrated into one chip or provided in physically separated locations.

According to an embodiment, the card IC chip 223 may perform payment based on the card information of the issued card. In other words, the card IC chip 223 may perform payment based on fee information received from roadside equipment.

To this end, the card IC chip 223 may include an issuer security domain (ISD), which is initially permanently installed in the card IC chip 223 by an initial card issuer (e.g., a manufacturer of the vehicle 20), and an SSD, which is installed by a service provider (card company) providing a payment service and requires to manage a separate key. In this instance, deletion and change of the card information may be performed only by the ISD and a structure of a security domain (SD) including the ISD and the SSD may comply with a GlobalPlatform (GP) card specification.

According to an embodiment, the head unit 230 may control the CCS. In other words, the head unit 230 may store CCS subscription information and transmit and receive data with the server 10 through the communicator 210 based on the CCS subscription information.

For example, the head unit 230 may receive the card issuance command or card deletion command from the server 10 through the communicator 210 and deliver the card issuance command or card deletion command, received from the server 10 through the communicator 210, to the ETCS terminal 220.

The constituent components of the server 10 and the vehicle 20 have been described above. Hereinafter, the server 10 that generates and transmits a signal for issuing or deleting a card is described in detail.

Figure 4:
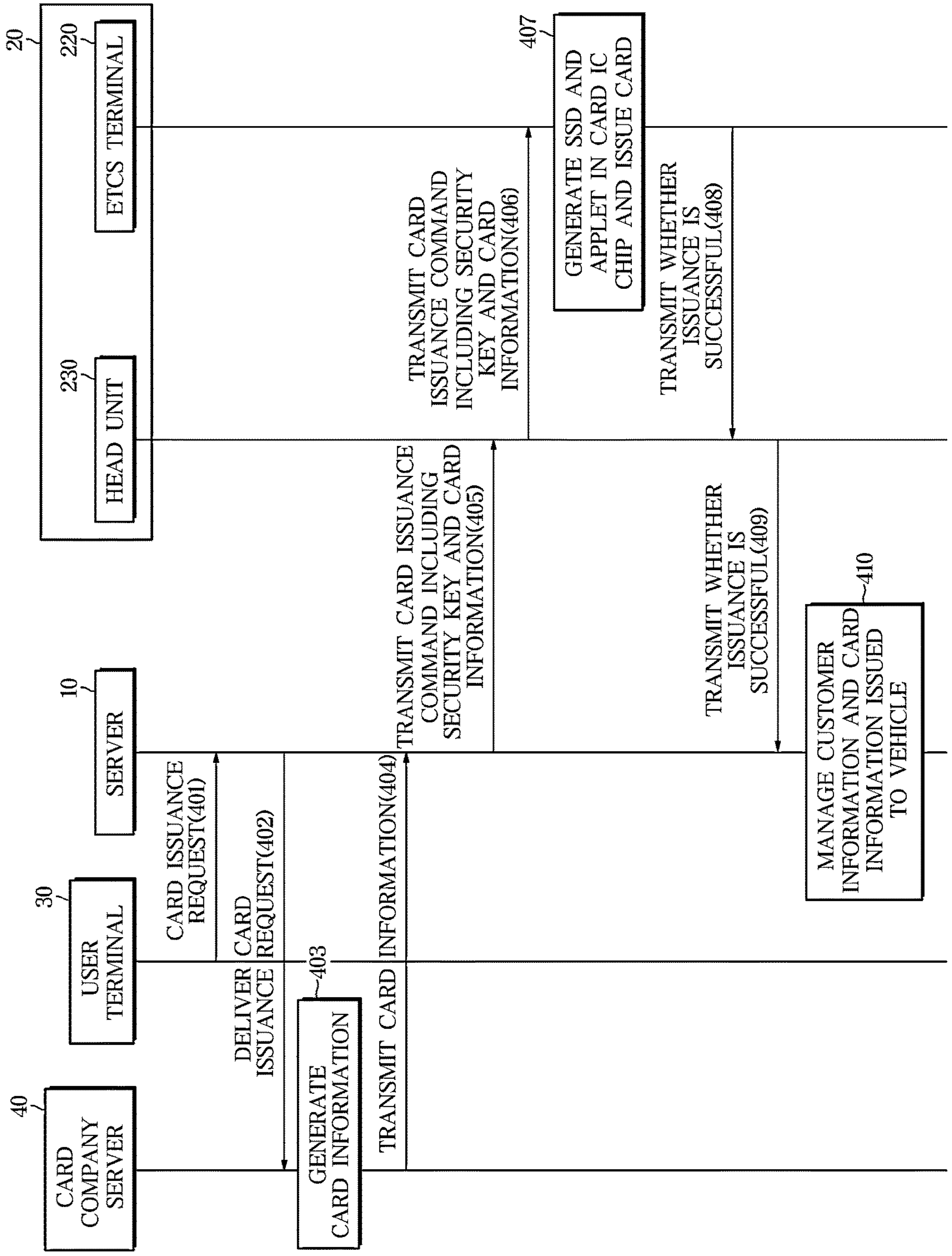
FIG. 4 is a signal flow graph when a server according to an embodiment receives a card issuance request from a user.
Figure 5:
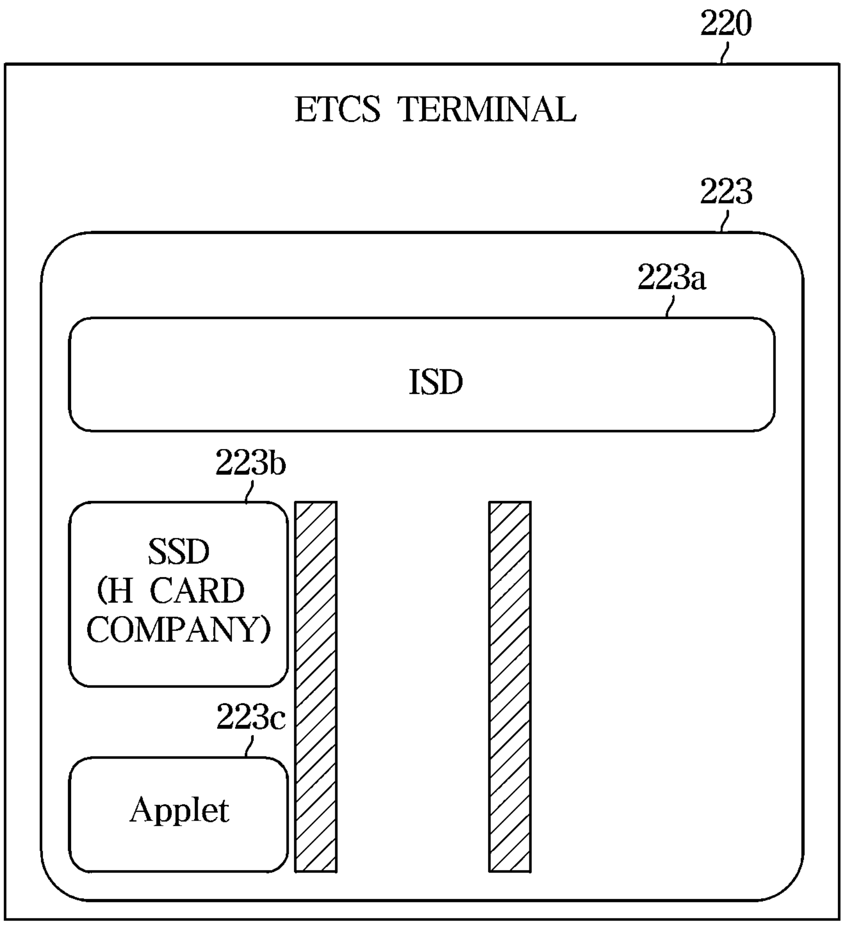
FIG. 5 is a diagram illustrating an example where a card is issued to a card integrated circuit (IC) chip of an ETCS terminal according to an embodiment.

FIG. 4 is a signal flow graph when the server 10 according to an embodiment receives a card issuance request from a user. FIG. 5 is a diagram illustrating an example where a card is issued to a card IC chip of an ETCS terminal according to an embodiment.

Referring to FIG. 4, the user terminal 30 according to an embodiment may request the server 10 for card issuance based on a user input (401).

According to an embodiment, when receiving the card issuance request from the user terminal 30, the server 10 may deliver the card issuance request to the card company server 40 corresponding to the card issuance request (402).

In this instance, the card company server 40 may generate card information based on the card issuance request (403) and transmit the card information to the server 10 (404). In this instance, the card information may include an expiration date, card serial number, issuance-eligible customer information, issuance-eligible vehicle information, and the like.

When receiving the card information from the card company server 40, the server 10 may transmit a card issuance command including a security key and the card information to the vehicle 20 (405).

In this instance, the security key corresponds to a key with an authority of issuance of card, and may be issued by a PerSAM. The PerSAM is a card-type security device that is required to be used only according to a specified procedure in order to securely deliver a key for issuing a card (electronic currency). In other words, the PerSAM is a module having key information required for issuance and may be provided by the Korea Expressway Corporation in charge of ETCS.

Also, the card issuance command may include an SSD creation command and an applet creation command.

According to an embodiment, when receiving the card issuance command from the server 10, the head unit 230 may transmit the card issuance command to the ETCS terminal 220 (406), and the ETCS terminal 220 may generate an SSD and an applet in the card IC chip 223 and issue a card (407).

Specifically, as shown in FIG. 5, by generating an SSD 223*b* and an applet 223*c* corresponding to the card information in the card IC chip 223 by using the security key, the ETCS terminal 220 may issue the card. In this instance, generation of the SSD 223*b* and the applet 223*c* may be performed by an ISD 223*a*.

Afterwards, the ETCS terminal 220 may transmit whether the issuance is successful to the head unit 230 (408), and the head unit 230 may transmit whether the issuance is successful to the server 10 (409). In other words, when issuing the card to the card IC chip 223 is completed, the ETCS terminal 220 may transmit a card issuance success confirmation message to the server 10 through the head unit 230.

According to an embodiment, when receiving the card issuance success confirmation message from the vehicle 20, the server 10 may match and store customer information and the card information issued to the vehicle 20 and thus manage the customer information and the card information issued to the vehicle 20 (410).

Figure 6:
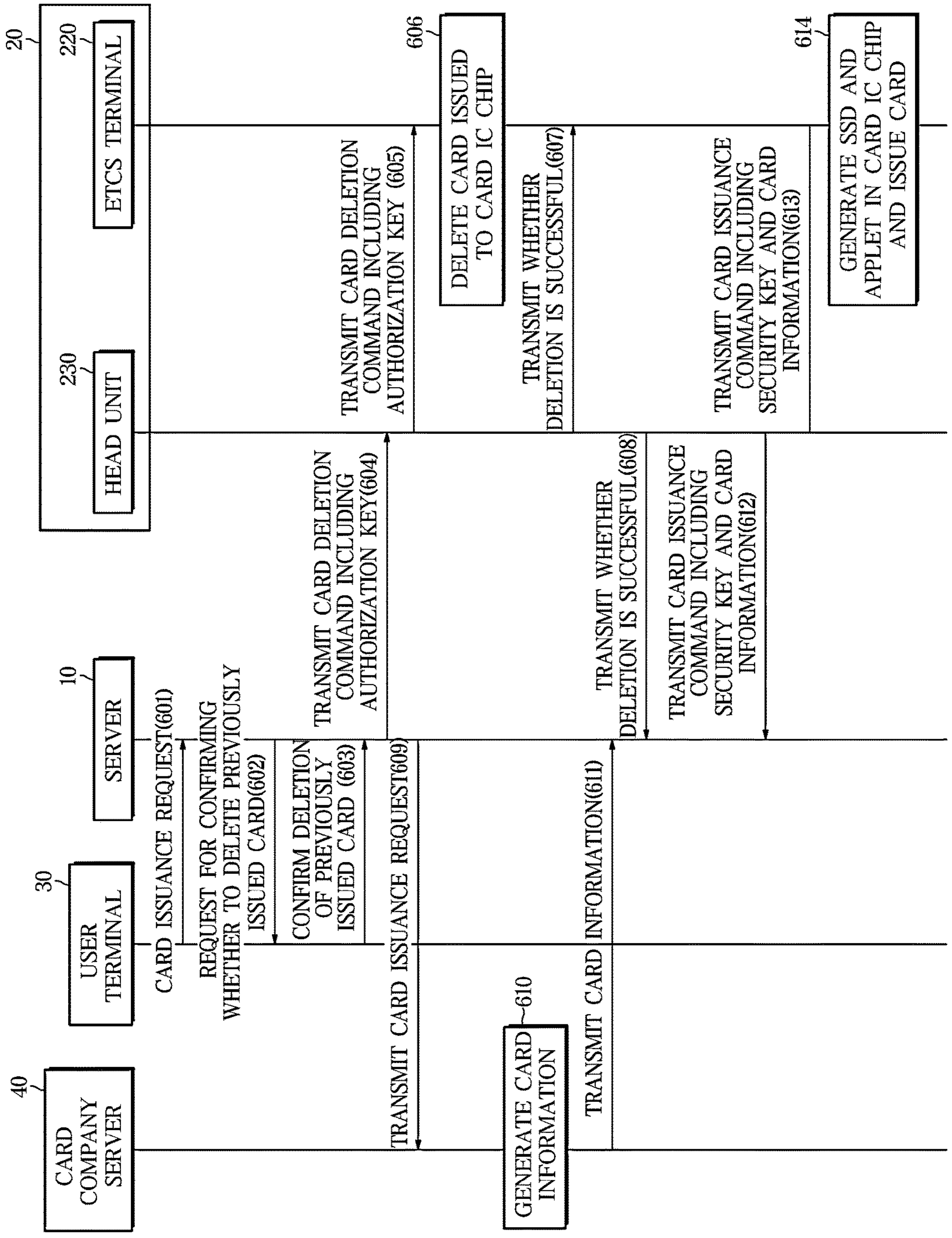
FIG. 6 is a signal flow graph when a server according to an embodiment receives a card issuance request from a user in a state where a previously issued card exists.
Figure 7:
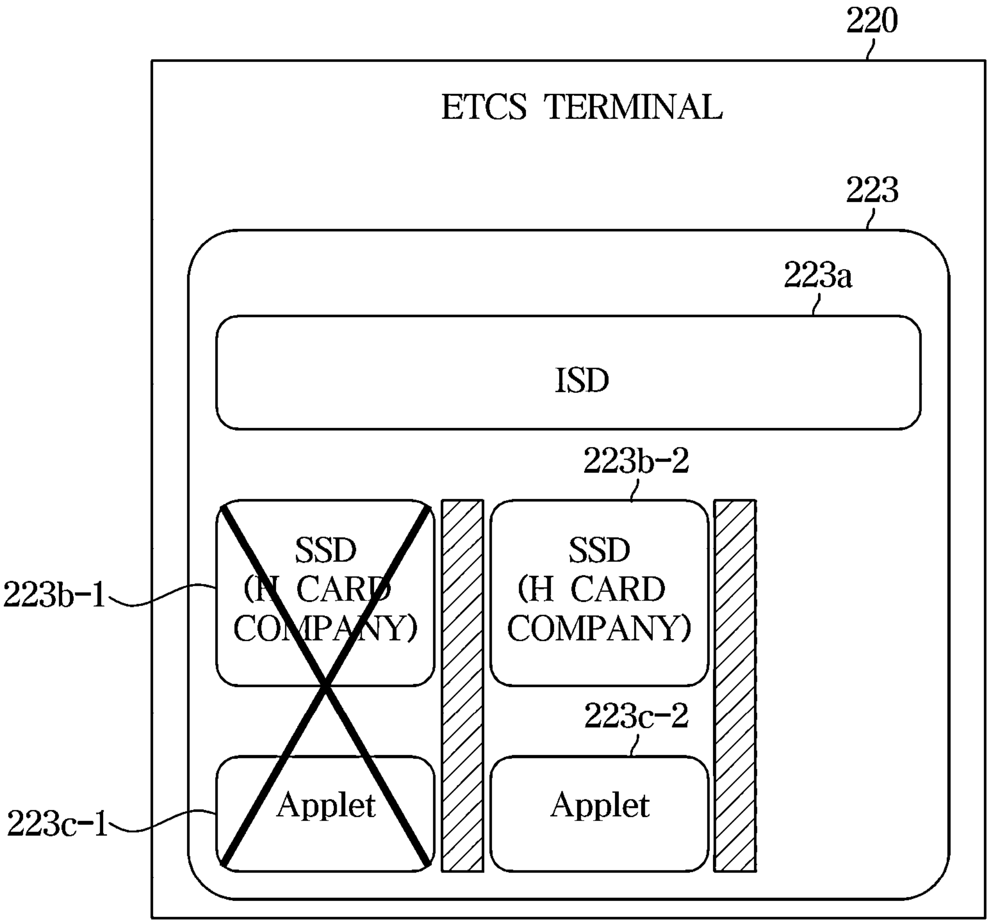
FIG. 7 is a diagram illustrating an example where a new card is issued in a state where a card has been issued to a card IC chip of an ETCS terminal according to an embodiment.

FIG. 6 is a signal flow graph when the server 10 according to an embodiment receives a card issuance request from a user in a state where a previously issued card exists. FIG. 7 is a diagram illustrating an example where a new card is issued in a state where a card has been issued to the card IC chip 223 of the ETCS terminal 220 according to an embodiment.

Referring to FIG. 6, the user terminal 30 according to an embodiment may transmit a card issuance request to the server 10 according to a user input (601).

According to an embodiment, when a previously issued card exists in the ETCS terminal 220, the server 10 may control the communicator 110 to transmit a message confirming whether to delete the previously issued card to the user terminal 30 (602).

In this case, the user terminal 30 may transmit the message confirming whether to delete the previously issued card (a deletion command for the previously issued card) to the server 10, based on a user input (603).

According to an embodiment, when receiving the deletion command for the previously issued card from the user terminal 30 through the communicator 110, the server 10 may transmit a card deletion command including an authorization key to the vehicle 20 (604). In this instance, the authorization key corresponds to a key with an authority to delete the card and may be issued by the PerSAM. Also, the card deletion command may include a SSD deletion command and an applet deletion command.

In this case, the head unit 230 receiving the card deletion command may deliver the card deletion command to the ETCS terminal 220 (605).

When receiving the card deletion command including the authorization key from the head unit 230 through the communication interface 221, the ETCS terminal 220 may delete the card issued to the card IC chip by using the authorization key (606).

In this instance, deleting the card issued to the card IC chip may be deleting an SSD 223*b*-1 and an applet 223*c*-1 corresponding to the card, as shown in FIG. 7.

Also, the ETCS terminal 220 may transmit whether the deletion of the card issued to the card IC chip 223 is successful to the head unit 230 (607), and the head unit 230 may transmit whether the card deletion is successful to the server 10 (608).

In other words, when deleting the card from the card IC chip 223 is completed, the ETCS terminal 220 may transmit a card deletion success confirmation message to the server 10 through the head unit 230.

Also, according to an embodiment, the server 10 may transmit a card issuance request to the card company server 40 corresponding to the card issuance request (609).

In this case, the card company server 40 may generate card information based on the card issuance request (610) and transmit the card information to the server 10 (611). In this instance, the card information may include an expiration date, card serial number, issuance-eligible customer information, issuance-eligible vehicle information, and the like.

When receiving the card information from the card company server 40, the server 10 may transmit a card issuance command including a security key and the card information to the vehicle 20 (612).

According to an embodiment, when receiving the card issuance command from the server 10, the head unit 230 may transmit the card issuance command to the ETCS terminal 220 (613), and the ETCS terminal 220 may generate an SSD and an applet in the card IC chip 223 and issue a card (614).

Specifically, as shown in FIG. 7, by generating a SSD 223*b*-2 and an applet 223*c*-2 corresponding to the card information in the card IC chip 223 by using the security key, the ETCS terminal 220 may issue the card. In this instance, generation of the SSD 223*b*-2 and the applet 223*c*-2 may be performed by the ISD 223*a*.

Afterwards, the ETCS terminal 220 may transmit whether the issuance is successful to the head unit 230, and the head unit 230 may transmit whether the issuance is successful to the server 10. In other words, when issuing the card to the card IC chip 223 is completed, the ETCS terminal 220 may transmit a card issuance success confirmation message to the server 10 through the head unit 230.

According to an embodiment, when receiving the card issuance success confirmation message from the vehicle 20, the server 10 may match and update customer information and the card information issued to the vehicle 20 and thus manage the customer information and the card information issued to the vehicle 20.

Figure 8:
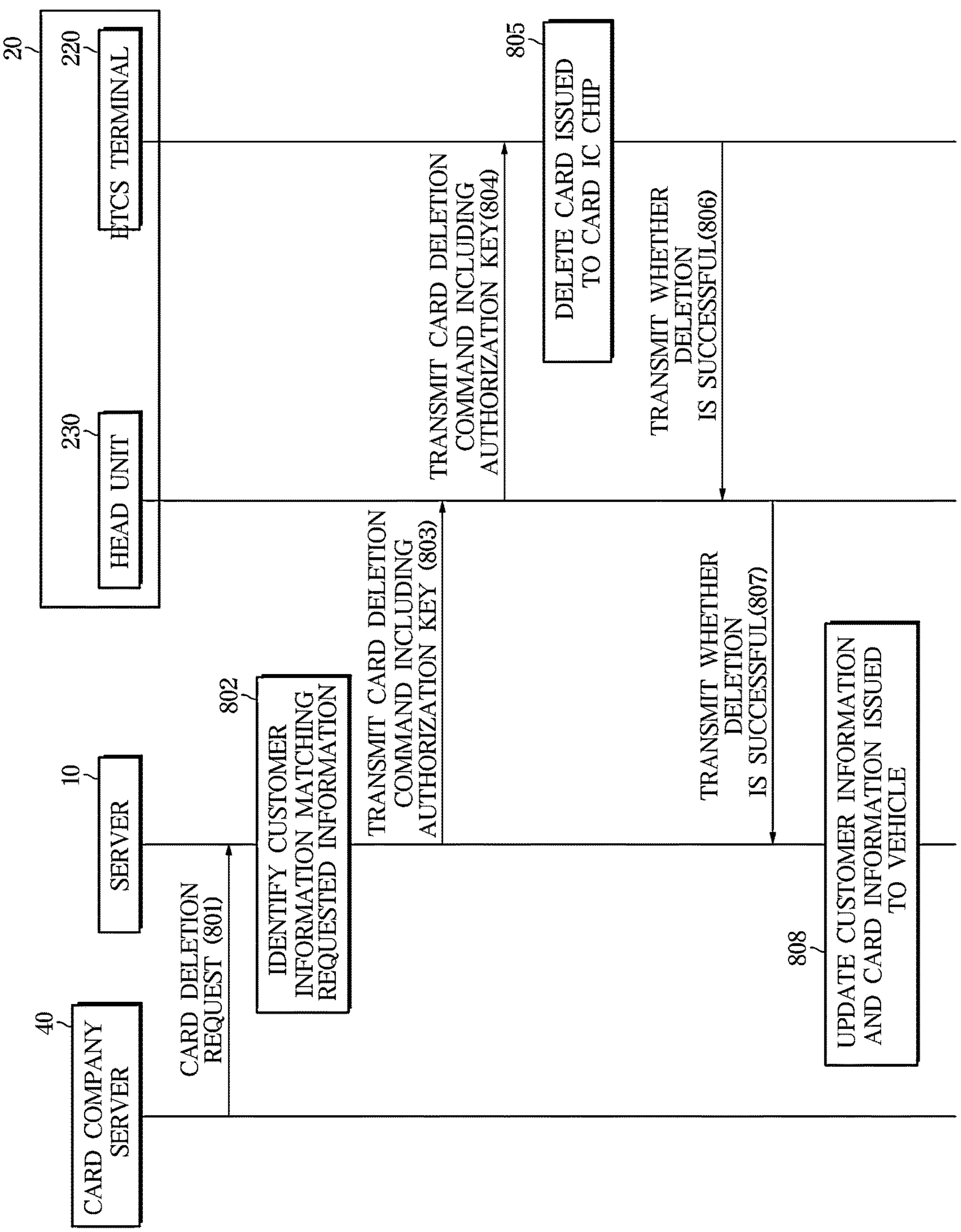
FIG. 8 is a signal flow graph when a server according to an embodiment receives a card deletion request from a card company.

FIG. 8 is a signal flow graph when the server 10 according to an embodiment receives a card deletion request from a card company.

Referring to FIG. 8, the card company server 40 according to an embodiment may transmit a card deletion request to the server 10 (801). In other words, the card company server 40 may transmit the card deletion request to the server 10, when a card has expired or payment is outstanding.

According to an embodiment, when receiving the card deletion request from the card company server 40 through the communicator 110, the server 10 may identify customer information corresponding to customer information of the card deletion request from among pre-stored customer information (802) and control the communicator to transmit a card deletion command including an authorization key to a vehicle corresponding to the identified customer information (803).

In this case, the head unit 230 may transmit the card deletion command, received from the server 10, to the ETCS terminal 220 (804).

When receiving the card deletion command including the authorization key from the head unit 230 through the communication interface 221, the ETCS terminal 220 may delete a card issued to the card IC chip using the authorization key (805). In this instance, deleting the card issued to the card IC chip may be deleting an SSD and an applet corresponding to the card.

Also, the ETCS terminal 220 may transmit whether the deletion of the card issued to the card IC chip 223 is successful to the head unit 230 (806), and the head unit 230 may transmit whether the card deletion is successful to the server 10 (807).

In other words, when deleting the card from the card IC chip 223 is completed, the ETCS terminal 220 may transmit a card deletion success confirmation message to the server 10 through the head unit 230.

According to an embodiment, when receiving the card deletion success confirmation message from the vehicle 20, the server 10 may update pre-stored card information issued to the vehicle 20 and thus update the customer information and the card information (808).

Hereinafter, embodiments of a control method of the server 10 according to an aspect of the disclosure are described. The server 10 according to the above-described embodiment may be used in the control method of the server 10. Accordingly, the above description with reference to FIGS. 1-8 may be equally applied to the control method of the server 10.

Figure 9:
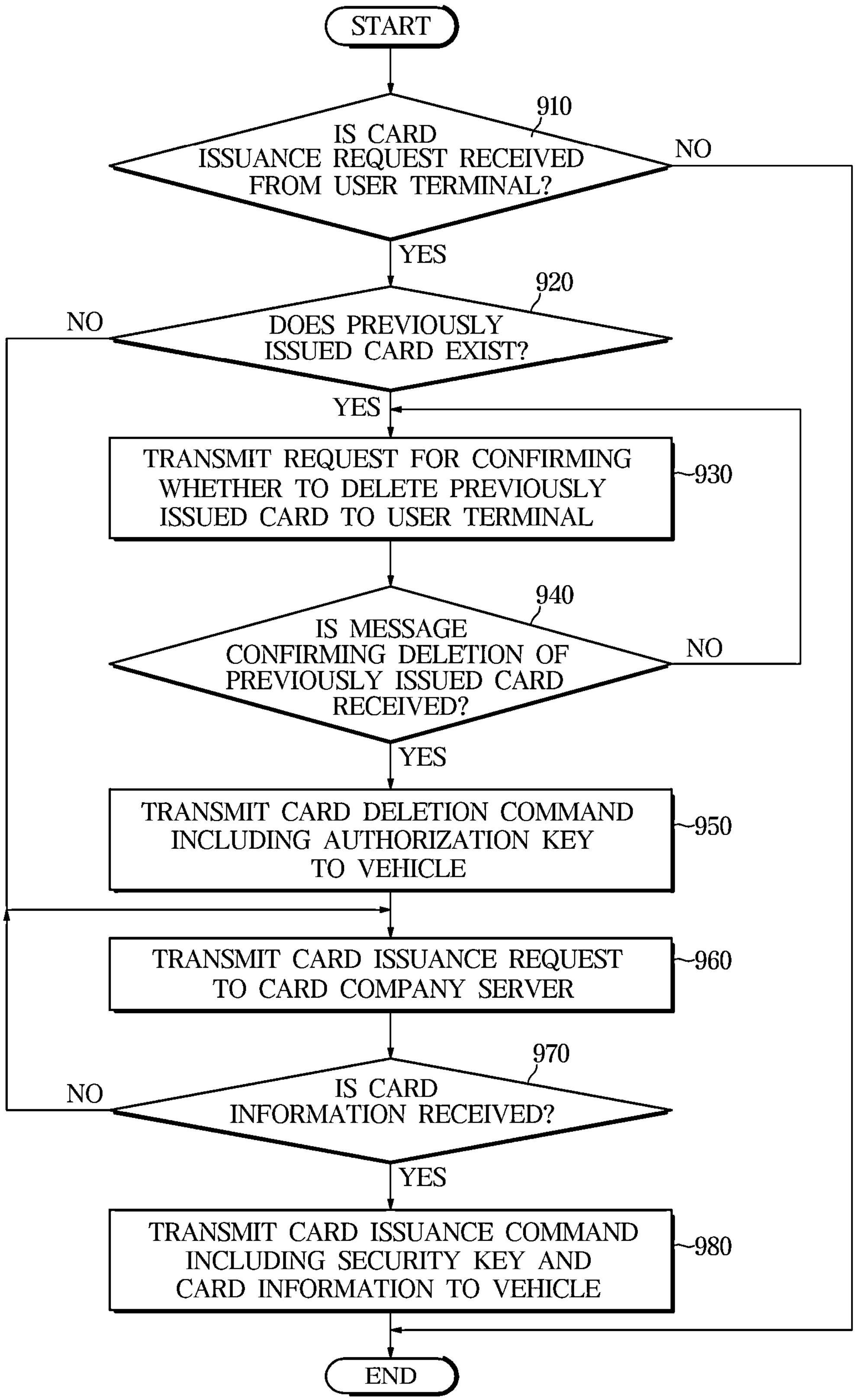
FIG. 9 is a flowchart illustrating operations of managing card issuance in a control method of a server according to an embodiment.

FIG. 9 is a flowchart illustrating operations of managing card issuance in a control method of the server 10 according to an embodiment.

Referring to FIG. 9, according to an embodiment, when a card issuance request is received from the user terminal 30 (Yes in operation 910), the server 10 may determine whether a previously issued card exists in the ETCS terminal 220 (920). In other words, the controller 120 may determine whether a card issued to a user of the user terminal 30 exists based on pre-stored customer information and card information, According to an embodiment, when the previously issued card exists (Yes in operation 920), the server 10 may transmit a request for confirming whether to delete the previously issued card to the user terminal 30 (930). When a message confirming the deletion of the previously issued card is received (Yes in operation 940), the server 10 may transmit a card deletion command including an authorization key to the vehicle 20 (950). In this instance, the authorization key corresponds to a key with an authority to delete the card and may be issued by the PerSAM. Also, the card deletion command may include an SSD deletion command and an applet deletion command.

According to an embodiment, the server 10 may transmit the card issuance request to the card company server 40 (960), and when card information is received (Yes in operation 970), transmit a card issuance command including a security key and the card information to the vehicle 20 (980).

In this instance, transmitting the card issuance request to the card company server 40 may be performed regardless of transmitting the card deletion command to the vehicle 20 and also be performed before or simultaneously with transmission of the card deletion command.

However, transmitting the card issuance command to the vehicle 20 may be performed after transmitting the card deletion command, for example, may be performed in response to receiving a card deletion success confirmation message from the vehicle 20.

Also, according to an embodiment, when the previously issued card does not exist (No in operation 920), the server 10 may transmit the card issuance request to the card company server 40 (960). Also, when the card information is received (Yes in operation 970), the server 10 may transmit the card issuance command including the security key and the card information to the vehicle 20 (980).

Figure 10:
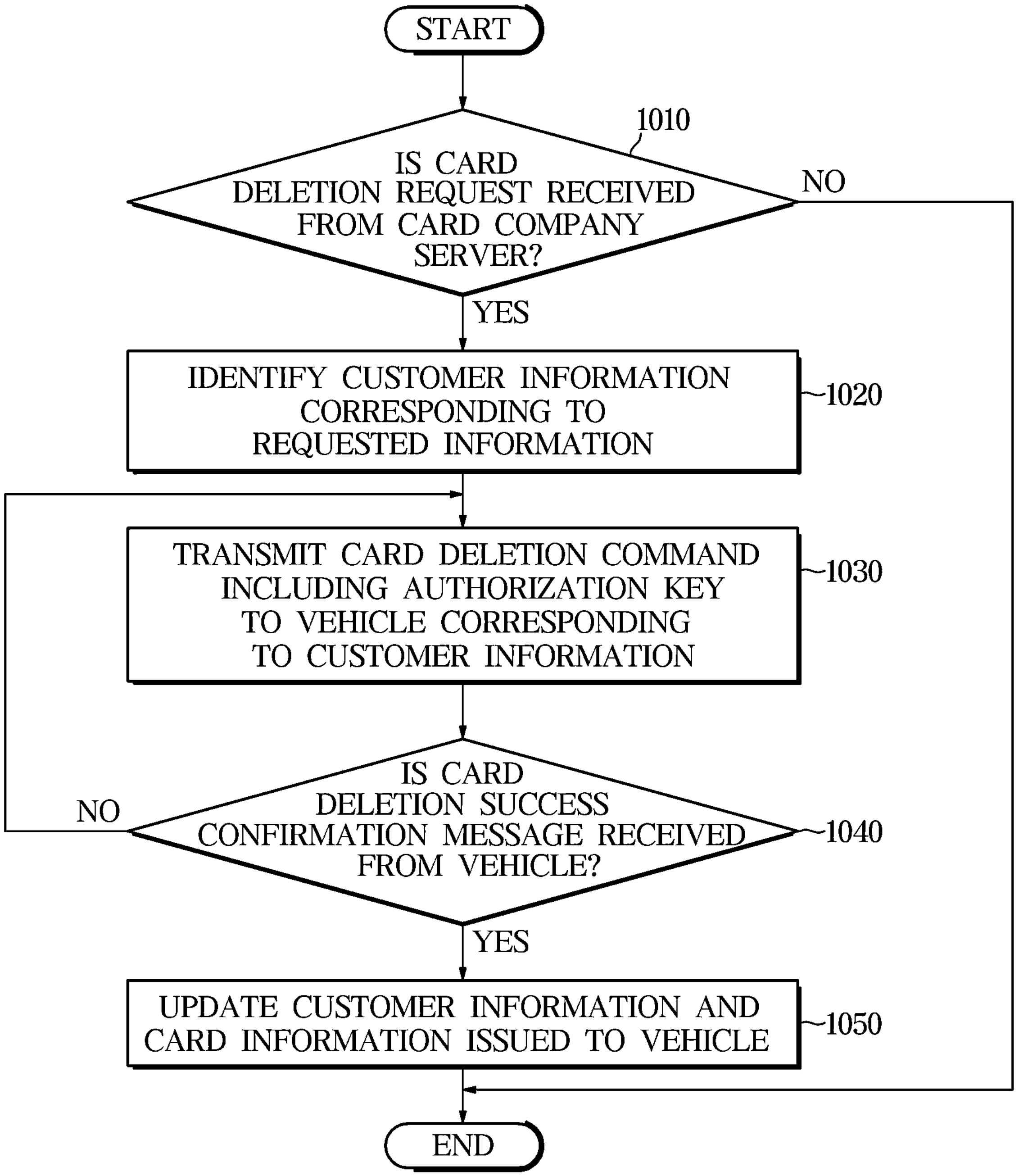
FIG. 10 is a flowchart illustrating operations of receiving a card deletion request from a card company in a control method of a server according to an embodiment.

FIG. 10 is a flowchart illustrating operations of receiving a card deletion request from a card company in a control method of the server 10 according to an embodiment.

Referring to FIG. 10, according to an embodiment, when a card deletion request is received from the card company server 40 (Yes in operation 1010), the server 10 may identify customer information corresponding to requested information (1020).

Specifically, when the card deletion request is received from the card company server 40 through the communicator 110, the server 10 may identify customer information corresponding to customer information of the card deletion request from among pre-stored customer information.

According to an embodiment, the server 10 may transmit a card deletion command including an authorization key to a vehicle corresponding to the identified customer information (1030), and when receiving a card deletion success confirmation message from the vehicle 20 (Yes in operation 1040), update the customer information and card information issued to the vehicle (1050).

In other words, when receiving the card deletion success confirmation message from the vehicle 20, the server 10 updates the pre-stored card information issued to the vehicle 20 and thus updates the customer information and the card information.

As is apparent from the above, according to the embodiments of the disclosure, the server and the control method thereof can manage a card performing payment in an ETCS terminal through issuance or deletion of the card and thus allow a card of a card company to be issued to a card IC chip of the ETCS terminal manufactured by a vehicle manufacturer.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A server, comprising:

a communicator; and a processor configured to control the communicator, wherein the processor is configured to:

receive a card issuance request from a user terminal through the communicator;

control the communicator to request card information to a card company server based on the received card issuance request;

identify that a previously issued card exists in an electronic toll collection system (ETCS) terminal of a vehicle based on pre-stored customer information corresponding to the received card issuance request;

control the communicator to transmit, to the user terminal, a message confirming whether to delete the previously issued card based on the identification of the existence of the previously issued card;

receive a deletion command for the previously issued card from the user terminal through the communicator;

obtain an authorization key having an authority to delete the previously issued card from a personal secure application module (PerSAM);

control the ETCS terminal of the vehicle to execute a card deletion command including the authorization key based on the received deletion command, wherein the card deletion command includes a deletion command of a supplementary security domain (SSD) and a deletion command of an applet;

receive card information from the card company server through the communicator;

obtain a security key having an authority to issue a new card from the PerSAM; and control the communicator to transmit a card issuance command including the security key and the card information to the ETCS terminal of the vehicle based on the card information received from the card company server.

2. The server of claim 1, wherein the card issuance command includes an SSD creation command and an applet creation command.

3. The server of claim 1, wherein the processor is configured to:

receive a card issuance success confirmation message from the vehicle through the communicator; and match and store customer information and the card information issued to the vehicle based on the received card issuance success confirmation message.

4. The server of claim 1, wherein processor is configured to:

receive a card deletion success confirmation message from the vehicle through the communicator; and control the communicator to transmit the card issuance command to the ETCS terminal of the vehicle based on the received card deletion success confirmation message.

5. The server of claim 4, wherein processor is configured to:

receive a card issuance success confirmation message from the vehicle through the communicator; and update pre-stored card information issued to the vehicle based on the card issuance success confirmation message.

6. The server of claim 3, wherein processor is configured to:

receive a card deletion request from the card company server through the communicator;

identify the customer information corresponding to customer information of a card deletion request from among pre-stored customer information based on the received card deletion request; and control the communicator to transmit the card deletion command comprising the authorization key to the vehicle corresponding to the identified customer information.

7. The server of claim 6, wherein processor is configured to:

receive a card deletion success confirmation message from the vehicle through the communicator; and update pre-stored card information issued to the vehicle based on the received card deletion success confirmation message.

8. A control method of a server comprising a communicator, the control method comprising:

receiving a card issuance request from a user terminal through the communicator;

controlling the communicator to request card information to a card company server based on the received card issuance request, identifying that a previously issued card exists in an electronic toll collection system (ETCS) terminal of a vehicle based on pre-stored customer information corresponding to the received card issuance request;

controlling the communicator to transmit, to the user terminal, a message confirming whether to delete the previously issued card based on the identification of the existence of the previously issued card;

receiving a deletion command for the previously issued card from the user terminal through the communicator;

obtaining an authorization key having an authority to delete the previously issued card from a personal secure application module (PerSAM);

controlling the ETCS terminal of the vehicle to execute a card deletion command including the authorization key based on the received deletion command for the previously issued card received from the user terminal through the communicator, wherein the card deletion command includes a deletion command of a supplementary security domain (SSD) and a deletion command of an applet;

receiving card information from the card company server through the communicator;

obtaining a security key having an authority to issue a new card from the PerSAM; and controlling the communicator to transmit a card issuance command including the security key and the card information to the terminal of the vehicle based on the card information received from the card company server.

9. The control method of claim 8, wherein the card issuance command includes an SSD creation command and an applet creation command.

10. The control method of claim 8, further comprising:

receiving a card issuance success confirmation message from the vehicle through the communicator; and matching and storing customer information and the card information issued to the vehicle based on the received card issuance success confirmation message.

11. The control method of claim 8, further comprising:

receiving a card deletion success confirmation message from the vehicle through the communicator; and controlling the communicator to transmit the card issuance command to the ETCS terminal of the vehicle based on the received card deletion success confirmation message.

12. The control method of claim 11, further comprising:

receiving a card issuance success confirmation message from the vehicle through the communicator; and updating pre-stored card information issued to the vehicle based on the card issuance success confirmation message.

13. The control method of claim 10, further comprising:

receiving a card deletion request from the card company server through the communicator;

identifying the customer information corresponding to customer information of a card deletion request from among pre-stored customer information based on the received card deletion request; and controlling the communicator to transmit the card deletion command comprising the authorization key to the vehicle corresponding to the identified customer information.

14. The control method of claim 13, further comprising:

receiving a card deletion success confirmation message from the vehicle through the communicator; and updating pre-stored card information issued to the vehicle based on the received card deletion success confirmation message.

* * * * *